E. H. MEYER & J. M. A. STILLESEN.
PREPARATION OF NITROGEN COMPOUNDS.
APPLICATION FILED SEPT. 15, 1908. RENEWED AUG. 2, 1910.
982,288.
Patented Jan. 24, 1911.
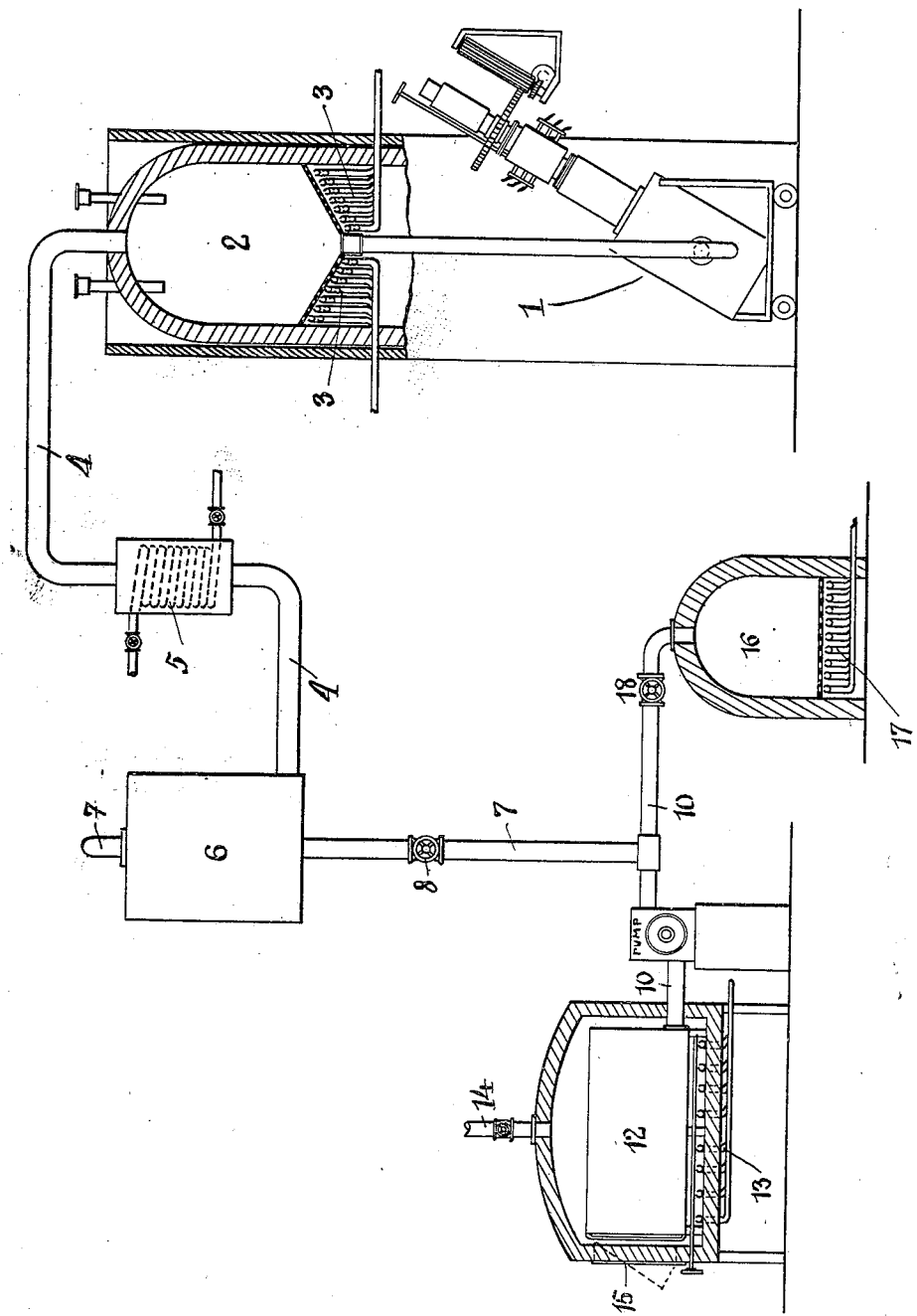

UNITED STATES PATENT OFFICE.

EINAR HONORATUS MEYER AND JOB MORTEN AUGUST STILLESEN, OF NIAGARA FALLS CENTRE, ONTARIO, CANADA.

PREPARATION OF NITROGEN COMPOUNDS.

982,288.  Specification of Letters Patent.  Patented Jan. 24, 1911.

Application filed September 15, 1908, Serial No. 453,113.  Renewed August 2, 1910.  Serial No. 575,180.

*To all whom it may concern:*

Be it known that we, EINAR HONORATUS MEYER and JOB MORTEN AUGUST STILLESEN, subjects of the King of Norway, residing at Niagara Falls Centre, in the Province of Ontario and Dominion of Canada, have invented certain new and useful Improvements in Preparation of Nitrogen Compounds, of which the following is a full, clear, and exact specification.

This invention relates to electro-chemistry, and has particular reference to the manufacture of nitrogen compounds, such for instance, as lime nitrogen, etc.

More particularly, the invention relates to a process for the preparation of lime nitrogen without free carbon.

In preparing calcium carbid in the electric furnace, calcium oxid is treated with an excess of carbon, to form calcium carbid with the evolution of carbon monoxid. In order to prepare lime nitrogen, we take calcium carbid and treat it in the presence of a flux and heat with nitrogen, together with carbon dioxid, to form a resultant product containing approximately thirty-five per cent. of nitrogen.

It is an object of this invention to prepare lime nitrogen and other compounds containing a larger percentage of combined nitrogen than has heretofore been obtained by treating calcium carbid preferably in the presence of a flux with determined proportions of nitrogen and carbon dioxid, whereby the free carbon heretofore present in lime nitrogen will be oxidized by the carbon dioxid to carbon monoxid, which, being a gas, will pass off, leaving the resulting lime nitrogen without free carbon.

The invention will be more fully understood in connection with the description of the apparatus employed, as shown in the accompanying drawing.

1 represents an electric furnace, wherein calcium carbid is produced by the action of an excess of carbon on lime, or free calcium by reduction of calcium oxid by carbon, in the electric arc. In order to obtain lime mixed with the desired proportion of carbon, a limestone retort 2 is provided in which limestone mixed with coal in the desired proportion, according as calcium carbid or calcium is to be prepared, and burned to lime and carbon by heat from gas burners 3. The gas used is a mixture of carbon monoxid from the carbid furnace with air, air and acetylene or other suitable gas, so that a complete combustion of the gas is obtained in the retort 2, together with the hydro-carbons which may be contained in the coal itself. From the retort 2 the lime and carbon are discharged into the electric furnace 1, either for producing calcium carbid or for producing pure calcium, according to the proportion of carbon used. The combustion products of the combustion of the gaseous products of the combustion of the gas at the burners 3 and volatile constituents of the coal consisting of nitrogen, carbon dioxid and water, are conducted by a pipe 4 through a drier 5, to remove the water of combustion and thence to a tank 6 containing lime water, or some other means for separating carbon dioxid so as to leave pure nitrogen. The drier 5 removes the water, and the lime water tank 6 removes the carbon dioxid, so the remaining gas will consist of pure nitrogen, which passes from the tank 6, through a pipe 7 containing a regulating valve 8.

For the preparation of pure lime nitrogen, that is to say, lime nitrogen without the admixture of free carbon, it is desirable to provide a source of carbon dioxid separate from the carbon dioxid given off from the retort 2, since by the use of a separate source of carbon dioxid the proportion of carbon dioxid admitted to the furnace 12 can be regulated in accordance with the particular lime nitrogen to be produced, it being possible, as before stated, to regulate the proportion of nitrogen by means of the valve 8.

16 represents an ordinary limestone furnace, which may be heated by burners 17 for forming carbon dioxid, which will pass through a regulating valve 18, and thence by pipe 10 to the furnace 12. The calcium carbid is charged into the furnace through a suitable charging door as 15, and the furnace is heated by burners 13. Also, a flux of calcium fluorid or cryolite, or both, is provided, and means for thoroughly mixing the gases with the melted carbid and flux. The typical reaction may be stated as follows:

$$CaC_2 + 2N + CO_2 = CaCN_2 + 2CO.$$

The flux does not react with the carbid, but has the function of promoting and assisting the reaction. Without the flux, the nitrogen combines with the carbid, if at all, only on the outside of the particles, leaving the inside unchanged. The carbid is, so to say, indifferent to the combination with the nitrogen without the flux, even though the temperature be raised as high as 1200 to 1500 degrees. Besides the greater yield of lime nitrogen, by reason of the flux, it is non-hygroscopic. Without treatment with carbon dioxid, the lime nitrogen contains free carbon particles disseminated through it, but the carbon dioxid is reduced by the free carbon under the influence of heat, to carbon monoxid, which passes off as a gas, leaving the lime nitrogen free of carbon. The result of this process is that whereas we have heretofore proposed to produce lime nitrogen containing free carbon, and having a percentage of less than thirty per cent. of nitrogen, by the process of this invention the product will contain about thirty-five per cent. of combined nitrogen. This is a considerable improvement in the manufacture of nitrogen compounds, since thereby is produced a pure compound free of carbon, whether of calcium or some other metal.

The temperature of the furnace will of course be regulated or varied as may be desired according to the conditions of actual practice, and the product it is desired to obtain. For the production of pure lime nitrogen free of carbon, 1400 degrees C. has been found suitable, and for the production of calcium nitrid 1000 degrees C. has been found satisfactory. It will be understood that the gases should be introduced into the furnace under a slight pressure, and the escape of the evolved gases will be controlled through a suitable vent from the furnace 14 so as to maintain the reactions under the proper conditions. While we have described by preference a separate source of carbon dioxid for the production of pure lime nitrogen, it will of course be understood that the carbon dioxid from the retort furnace 2 may be used mixed with nitrogen without passing through the tank 6, though the proportion of carbon dioxid cannot in this manner be as closely proportioned to the chemical requirements and equivalents as by producing carbon dioxid from a separate source such as the retort 16.

While we have described our invention with respect to a particular apparatus, we wish it to be understood that the invention, in so far as the apparatus and process are concerned, is not to be restricted thereto, nor to the particular arrangements and proportions herein described, it being within the scope of this invention to modify the process of said apparatus in various particulars without departing therefrom.

Having thus described our invention, we declare that what we claim as new and desire to secure by Letters Patent, is:—

1. The process of preparing lime nitrogen consisting in treating calcium carbid with nitrogen and carbon dioxid.

2. The process of preparing lime nitrogen consisting in treating calcium carbid with nitrogen, and eliminating carbon from the resulting product.

3. The process of preparing lime nitrogen consisting in treating calcium carbid with nitrogen, and eliminating carbon from the resulting product by oxidation.

4. The process of preparing lime nitrogen consisting in treating calcium carbid with nitrogen, and eliminating carbon from the resulting product by oxidation with carbon dioxid.

5. The process of preparing lime nitrogen consisting in treating calcium carbid with nitrogen, and eliminating carbon from the resulting product by oxidation with a determined proportion of carbon dioxid.

6. The process of preparing lime nitrogen consisting in treating calcium carbid with nitrogen in the presence of a flux, and eliminating carbon from the resulting product.

7. The process of preparing lime nitrogen consisting in treating calcium carbid with nitrogen in the presence of a flux, and eliminating carbon from the resulting product by treatment with carbon dioxid.

8. The process of preparing lime nitrogen consisting in reducing limestone to lime by combustion of a gas with air, heating the lime in the presence of carbon to form carbid, and treating the carbid with the nitrogen from the combustion gases and carbon dioxid to produce a compound of lime, carbon and nitrogen free of uncombined carbon.

9. The process of removing free carbon from a compound comprising combined calcium, carbon and nitrogen consisting in heating such compound with carbon dioxid.

10. The process of preparing lime nitrogen consisting in treating calcium carbid with nitrogen in the presence of a flux comprising a fluorid, and eliminating free carbon therefrom by oxidation.

11. The herein described process consisting in treating calcium carbid with nitrogen and carbon dioxid in the presence of a flux comprising a fluorid.

12. The herein described process consisting in treating heated calcium carbid and a flux with nitrogen and carbon dioxid.

In testimony whereof we affix our signatures, in presence of two witnesses.

EINAR HONORATUS MEYER.
JOB MORTEN AUGUST STILLESEN.

Witnesses:
G. W. LEIGHBAU,
J. E. RICHARDSON.